United States Patent Office 3,712,929
Patented Jan. 23, 1973

---

3,712,929
1-PERFLUOROALKYL-1,2,2-TRIPHENYL-ETHYLENES
William J. Middleton, Wilmington, Del., assignor to E. I. du Pont de Nemours and Company, Wilmington, Del.
No Drawing. Filed Oct. 31, 1969, Ser. No. 873,078
Int. Cl. C07c 43/20
U.S. Cl. 260—612 R    6 Claims

ABSTRACT OF THE DISCLOSURE

Certain 1 - perfluoroalkyl - 1,2,2-triphenylethylenes are effective in preventing pregnancy in warm-blooded animals and can be administered after coitus. The preferred 1 - perfluoroalkyl - 1,2,2 - triphenylethylenes have an oxygen atom attached to the para position of at least one of the benzene rings, possible substituents including the hydroxyl, an alkoxy group, and an acyloxy group. The benzene ring in the 1-position of 1-perfluoroalkyl-1,2,2-triphenylethylene can have one or more halogen or lower perfluoroalkyl substituents.

BACKGROUND OF THE INVENTION

This invention relates to certain 1-perfluoroalkyl-1,2,2-triphenylethylenes, and to the use of these compounds in the prevention of pregnancy.

Certain trifluoromethyl-1,1,2-triphenylethylenes have been reported to have either anti-gonadotropin or estrogenic activity. Thus, Fox, Gibas, Lee, and Boris, J. Med. Chem., 8, 250 (1965) report the preparation and biological activity of 2-(m-trifluoromethylphenyl)-1,1-diphenylethylene and of its 1-(p-tolyl) homolog. Buu-Hoi, Nam, and Xuoung, Rec. Trav. Chim., 85, 367 (1966) describe a number of estrogenic 1,1,2-triphenylethylenes and 2-bromo-1,1,2-triphenylethylenes bearing the trifluoromethyl group in various positions of the phenyl rings. Dice, Scheinman, and Berrodin, J. Med. Chem., 9, 176 (1966) report the preparation of 1-trifluoromethyl-2-(m-pyridyl)-1,2-diphenylethylene, which is a potent estrogen. However, no 1 - perfluoroalkyl - 1,2,2-triphenylethylenes have been heretofore reported.

At present, there are widely used antifertility agents which act to establish a pseudopregnant condition in the female and thereby prevent ovulation. In general, these are mixtures of estrogens and progestins, and they must be taken daily during a major portion of the menstrual cycle. Unfortunately, administration of these mixtures can result in side effects similar to those commonly occurring during early pregnancy.

There is a need, however, for antifertility agents which can be administered after coitus and which do not have the undesirable pseudopregnancy side effects.

SUMMARY OF THE INVENTION

Now, according to this invention, it has been discovered that certain new 1-perfluoroalkyl-1,2,2-triphenylethylenes are effective antifertility agents when administered after coitus. It is probable that the mechanism of action is such that nidation is prevented. Compounds of this invention are easy to use and reduce undesirable pseudopregnancy side effects.

The novel compounds of this invention have the formula

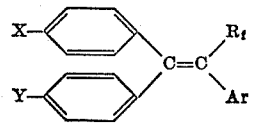

in which X and Y, which may be the same or different, are H or OR; R being hydrogen, alkyl, hydroxyalkyl, aliphatic secondary aminoalkyl (including heterocyclic amine derivatives such as morpholinoalkyl, piperidinoalkyl and pyrrolidinoalkyl) or an acyl group derived from an alkanoic, cycloalkanoic, cycloalkenoic, hydroxyalkanoic, dialkylaminoalkanoic, or aromatic acid; the total carbon content of each R substituent not exceeding 12 carbon atoms; $R_f$ is a perfluoroalkyl group of up to 3 carbon atoms; and Ar is phenyl or a substituted phenyl containing one or more alike or different substituents, selected from halogen and lower perfluoroalkyl radicals; or phenyl containing in the para position a substituent OR as previously defined with the proviso that when X and Y are each hydrogen, Ar is phenyl having an alkoxy substituent in the para position.

Among the preferred compounds of this invention are those having oxygen in the para-position of at least one of the benzene rings, e.g., compounds of the formulas

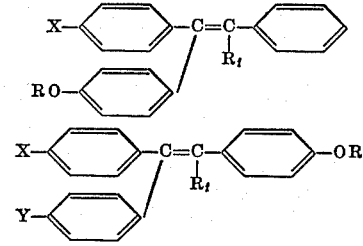

in which X, Y, R and $R_f$ are defined as above.

DETAILED DESCRIPTION OF THE INVENTION

Representative R groups which are contemplated by this invention are: methyl, ethyl, butyl, hexyl, octyl and dodecyl, including both straight chain and branched radicals; hydroxyethyl, hydroxypropyl, hydroxyhexyl, hydroxynonyl, dimethylaminoethyl, diethylaminoethyl, dipropylaminobutyl, dibutylaminohexyl, N - morpholinoethyl, N-piperidinopropyl, N-pyrrolidinomethyl, formyl, acetyl, propionyl, cyclohexanoyl, decanoyl, lactoyl, salicyl, diethylaminoacetyl, diethylaminobutyryl, benzoyl, 1-naphthoyl, and 4-toluyl.

Instead of the —OR substituent in the para-position, the Ar radical may carry one or more substituents such as fluorine, chlorine, bromine, iodine, trifluoromethyl, pentafluoroethyl, heptafluoropropyl, heptafluoroisopropyl, nonafluorobutyl, nonafluoroisobutyl, nonafluoro-sec.-butyl, and nona-fluoro-tert.-butyl.

The $R_f$ radical is preferably trifluoromethyl but can be pentafluoroethyl, heptafluoropropyl, or heptafluoroisopropyl. At least one of X and Y is preferably hydroxyl, a $C_1$-$C_3$ alkoxy group, or a $C_1$-$C_3$ acyl group.

These triphenylethylenes in which X and Y each independently is H, OH, or an alkoxy group; $R_f$ is triflfluoromethyl and Ar is phenyl, para-hydroxyphenyl or para-alkoxyphenyl, can be prepared by the stepwise replacement of fluorines attached to the ethylenic carbons of hexafluoropropene by reaction with phenyllithium, p-alkoxyphenyllithium, or p-LiOC$_6$H$_4$Li as illustrated, for example, by the following equations:

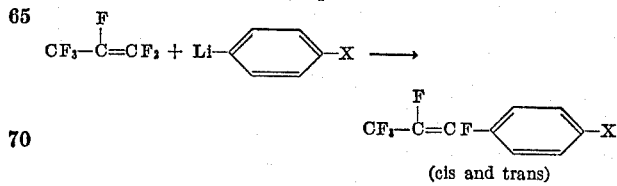

(cis and trans)

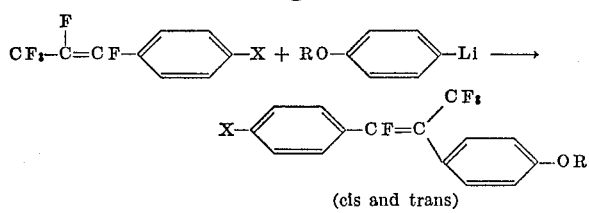

(cis and trans)

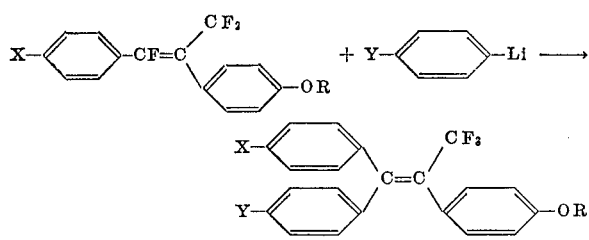

When p-LiOC$_6$H$_4$Li is used in these reactions, an additional acidification step is necessary, to free the p-hydroxy group from its salt. Alternatively, the vinyl fluorines of 2 - phenyl-pentafluoropropene or 2 - (p-alkoxyphenyl)-pentafluoropropene can also be stepwise replaced by reaction with phenyllithium or p-alkoxyphenyllithium, as illustrated by the following equations.

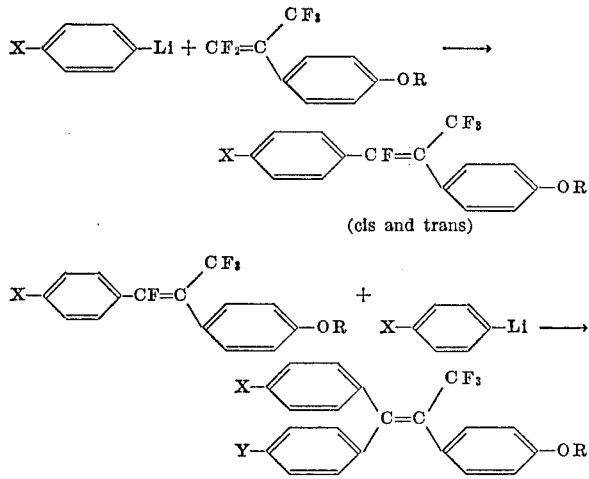

(cis and trans)

The phenylpentafluoropropenes used as the starting materials in this method can be prepared by a reaction of trifluoroacetophenones with difluoromethylenephenylphosphorane according to the directions of F. E. Herkes and D. J. Burton, J. Org. Chem., 32, 1311 (1967).

The same triphenylethylenes can also be prepared by a reaction of phenyllithium or a p-alkoxyphenyllithium with a 1,1-diphenyl-2,3,3,3-tetrafluoropropene of the formula:

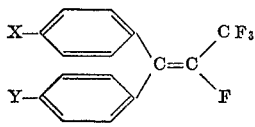

in which X and Y each independently is H or an alkoxy group. The diphenylpropenes used in this preparation can be prepared by a reaction of the corresponding diphenyldiazomethanes with trifluorothioacetyl fluoride.

All of these reactions between the fluoropropenes and lithium compounds are conducted in the presence of an inert solvent such as diethyl ether or an aliphatic or aromatic hydrocarbon. The optimum reaction temperature is between −80° and +40° C., and the optimum pressure is between ½ and 3 atmospheres, atmospheric pressure being the most convenient to employ. The reaction products can be isolated and purified by conventional techniques such as distillation, recrystallization, and chromatography.

While some of the synthetic methods have been discussed above, other methods of preparation of the new 1-perfluoroalkyl-1,2,2-triphenylethylenes will become apparent from the following examples and Table I. In the examples, all temperature data are in degrees centigrade. The abbreviation THF, when used, stands for tetrahydrofuran.

EXAMPLE 1

1-(trifluoromethyl)-1,2,2-triphenylethylene (X=Y=H; R$_f$=CF$_3$; Ar=C$_6$H$_5$) Method A

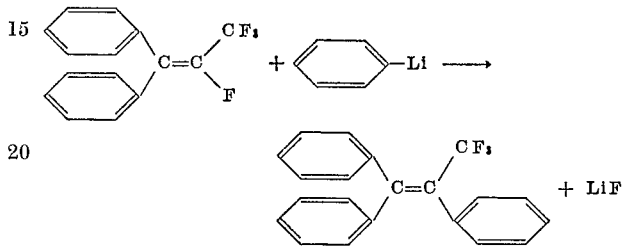

A solution of commercial phenyllithium (0.029 mole in 15 ml. of ether-benzene) was added dropwise to a stirred solution of 6.66 g. (0.025 mole) of 1-fluoro-1-(trifluoromethyl)-2,2-diphenylethylene in 20 ml. of ether cooled in an ice-bath. The reaction mixture was stirred for 2 hrs. and mixed with 50 ml. of 10% hydrochloric acid. The ether layer was separated, washed with water, dried over MgSO$_4$, and evaporated to dryness under a stream of nitrogen (7.7 g. of crude product). Recrystallization from pentane gave 4.5 g. of 1-(trifluoromethyl)-1,2,2-triphenylene as colorless crystals: M.P. 83–85°; F$^{19}$ NMR (CCl$_3$F) $\delta$ 56.1 p.p.m. (s.); UV (EtOH) $\lambda_{max}$. 263 m$\mu$ ($\epsilon$ 8,460), 224 m$\mu$ ($\epsilon$ 19,800).

*Analysis.*—Calcd. for C$_{21}$H$_{15}$F$_3$ (percent): C, 77.76; H, 4.66; F, 17.58. Found (percent): C, 77.85; H, 4.63; F, 17.42.

The starting 1-fluoro-1-(trifluoromethyl)-2,2-diphenylethylene was prepared as follows:

A mixture of 19.6 g. (0.1 mole) of benzophenone hydrazone, 22 g. (0.1 mole) of yellow mercuric oxide, and 100 ml. of pentane was stirred at room temperature for 17 hrs. Magnesium sulfate, 20 g., was added, and the suspension was stirred for 1 hr. and filtered. The filtrate was transferred to a round-bottom flask and cooled to 0°. Perfluorothioacetyl fluoride was bubbled into the rapidly stirred solution until the purple color of the diazo compound disappeared. The solution was stirred at room temperature overnight and distilled to give 15 g. of 1-fluoro-1-(trifluoromethyl)-2,2-diphenylethylene boiling at 80° (1.7 mm.).

The H$^1$ NMR showed a singlet at 3.50$\tau$ (2C$_6$H$_5$). The F$^{19}$ NMR showed a quartet (J=10 cps.) at 67.3 p.p.m. (F) and a doublet (J=10 cps.) at 64.7 p.p.m. (CF$_3$).

*Analysis.*—Calcd. for C$_{15}$H$_{10}$F$_4$ (percent): C, 67.67; F, 28.54; H, 3.79. Found (percent): C, 67.39; F, 28.24; H, 3.86.

EXAMPLE 2

1-trifluoromethyl-1,2,2-triphenylethylene Method B (a)

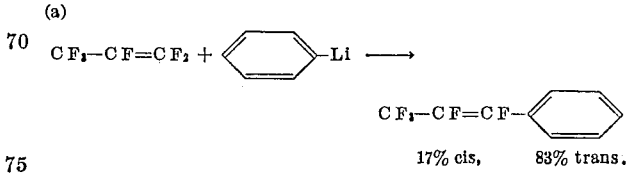

17% cis, 83% trans.

(b)

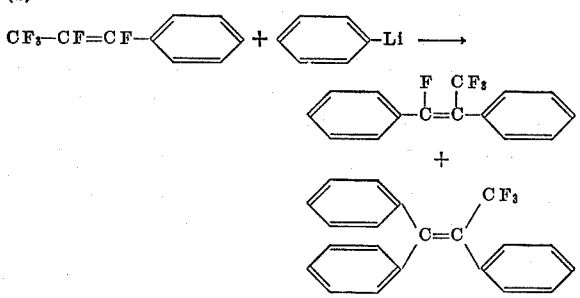

A sample of 1-phenylpentafluoropropene, B.P. 140–151°, prepared by the method of Dixon [J. Org. Chem., 21, 400 (1956)] was found to be a 17:83 mixture of the cis and trans form. The pure trans form was isolated by distillation as the higher boiling fraction: B.P. 150–151°; $n_D^{25}$ 1.4433; UV (ethanol $\lambda_{max}$ 245 m$\mu$ ($\epsilon$ 18,000); IR (liquid) 5.85$\mu$ (CF=CF); H$^1$ NMR (CCl$_3$F) $\tau$ 2.57 (m.); F$^{19}$ NMR (CCl$_3$F) $\delta$ 68.7 p.p.m. (d., J=22.3 Hz. to d., J=10 Hz., CF$_3$), 146.9 p.p.m. (d., J=133 Hz. to quartet, J=22.3 Hz., $\alpha$F), 170.1 p.p.m. (d., J=133 Hz. to quartet, J=10 Hz., F).

The pure cis form was isolated by preparative gas chromatography on a fluorosilicone column, and was obtained as a colorless liquid: B.P. 141°; $n_D^{25}$ 1.4311; H$^1$ NMR (CCl$_3$F) $\tau$ 2.62 (s); UV (ethanol) $\lambda_{max}$ 233 m$\mu$ ($\epsilon$ 8,940); F$^{19}$ NMR (CCl F) $\delta$ 66.3 p.p.m. (d., J=8 Hz. to d., J=13 Hz., CF$_3$), 109.7 p.p.m. (d., J=8 Hz. to quartet, J=8 Hz., 1F) and 155.1 p.p.m. (d.=J=8 Hz. to quartet, J=13 Hz., 1F); IR (liquid) 5.79$\mu$ (CF=CF).

A solution of 0.16 mole of phenyllithium in 75 ml. of 75/25 benzene-ether was added dropwise with stirring to a solution of 31.2 g. (0.15 mole) of the 1-phenylpentafluoropropene mixture of isomers in 200 ml. of ether cooled in a Dry Ice-acetone bath. The reaction mixture was then warmed to room temperature and mixed with 100 ml. of 10% HCl. The ether layer was separated, washed with water, dried on MgSO$_4$ and distilled to give two main fractions.

The lower boiling fraction, B.P. 117–119° (5 mm.), 12 g., partially solidified upon cooling. Recrystallization from pentane gave 8.1 g. of cis-1,2-diphenyltetrafluoropropene as long colorless rods: M.P. 43–44°; UV (ethanol) $\lambda_{max}$ 254 m$\mu$ ($\epsilon$ 11,300); F$^{19}$ NMR (CCl$_3$F) $\delta$ 58.8 p.p.m. (d., J=24 Hz., CF$_3$), 93.1 p.p.m. (quartet, J=24 Hz., =C—F).

The higher boiling fraction, B.P. 150–155° (2 mm.) also solidified upon cooling. Recrystallization from pentane gave 1.8 g. of 1-(trifluoromethyl)-1,2,2-triphenylethylene as colorless crystals, M.P. 80–84°, identified by comparing their infrared spectrum with that of the product of Example 1.

EXAMPLE 3 cis-1-(trifluoromethyl)-2-(p-methoxypenyl)-1,2-diphenylethylene (X=OCH$_3$; Y=H; R$_f$=CF$_3$; Ar=C$_6$H$_5$)

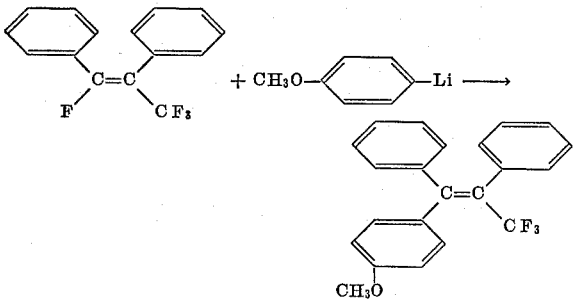

A solution of 5.32 g. (0.02 mole) of cis-1,2-diphenyltetrafluoropropene in 5 ml. of ether was added dropwise over a period of 15 min. to a solution of p-methoxyphenyllithium (prepared in the usual manner from 0.35 g. lithium and 5.61 g. p-bromoanisole) in 30 ml. of ether at room temperature. The reaction mixture was stirred for one hr. and then mixed with 100 ml. of 10% HCl. The ether layer was separated, washed with water, dried on MgSO$_4$ and distilled to give 1.9 g. of a liquid, B.P. 130–160° (0.1–0.25 mm.) which solidified on cooling. Recrystallization from pentane gave cis-1-(trifluoromethyl)-2-(o-methoxyphenyl)1,2-diphenylethylene as a colorless solid. M.P. 73–74.5°; UV (ethanol) $\lambda_{max}$ 280 m$\mu$ ($\epsilon$ 10,800), 232 m$\mu$ ($\epsilon$ 21,000); F$^{19}$ NMR (CC$_3$F) $\delta$ 56.1 p.p.m. (s.); H' NMR (CCl$_3$F) $\tau$ 6.35 (s, OCH$_3$), $\tau$ 2.7–3.4 (m., 14H).

Analysis.—Calcd. for C$_{22}$H$_{17}$F$_3$O (percent): C, 74.56; H, 4.84; F, 16.09. Found (percent): C, 74.40; H, 4.95; F, 16.01.

EXAMPLE 4

Trans-1-(trifluoromethyl)-2-(p-methoxyphenyl)-1,2-diphenylethylene (X=H; Y=OCH$_3$; R$_f$=CF$_3$; Ar=C$_6$H$_5$)

(a)

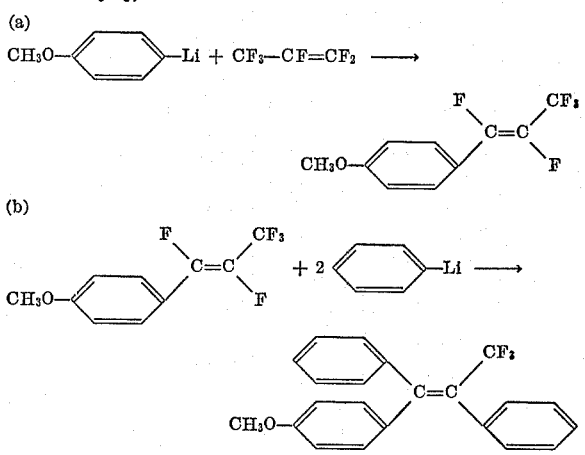

A solution of 62 g. (0.33 mole) of p-bromoanisole in 50 ml. of ether was added dropwise to a stirred solution of 0.32 mole of butyllithium in 200 ml. of hexane and 400 ml. of ether. The mixture was stirred for 4 hours and then cooled to −78°. Hexafluoropropylene, 19 ml. (ca. 0.2 mole) was distilled into the solution, and then the reaction mixture was warmed to 0° and mixed with 200 ml. of 10% HCl. The organic layer was separated, washed with water, dried (MgSO$_4$), and then distilled to give three principal fractions.

Fraction A, 17.3 g., was shown to be a mixture of 21% cis and 79% trans-1-(p-methoxyphenyl)pentafluoro-propene by its F$^{19}$ NMR spectra and gas chromatographic analysis: B.P. 62–68° (1.0 mm.); F$^{19}$ NMR (CCl$_3$F) for cis isomer only, $\delta$ 66.1 p.p.m. (d., 13 Hz. to d., 9 Hz. for CF$_3$), 108.1 p.p.m. (m. for $\alpha$F), and 175.7 p.p.m. (quartet, 13 Hz. to d., 10 Hz. for $\beta$F).

Fraction B, 20.2 g., was pure trans-1-(p-methoxyphenyl)pentafluoropropene: B.P. 68–69° (1.0 mm.); $n_D^{25}$ 1.4767; UV (ethanol) $\lambda_{max}$ 267 m$\mu$ ($\epsilon$ 21,400); IR (liquid) 5.87$\mu$ (CF=CF); F$^{19}$ NMR (CCl$_3$F) $\delta$ 67.3 p.p.m. (d., 22 Hz. to d., 11 Hz., CF$_3$), 140.2 p.p.m. (d. 130 Hz., to quartet, 11 Hz., $\beta$F); H$^1$ NMR (CCl$_3$F) $\tau$ 2.86 (A$_2$B$_2$), $\tau$ 6.31 (s., CH$_3$).

Analysis.—Calcd. for C$_{10}$H$_7$F$_5$O (percent): C, 50.43; H, 2.97; F, 39.89. Found (percent): C, 50.38; H, 3.22; F, 39.76.

Fraction C, 3.3 g., was a by-product, trans-1-(5-bromo-2-methoxyphenyl)pentafluoropropene: B.P. 94–95° (1.0 mm.); $n_D^{25}$ 1.4924; UV (ethanol) $\lambda_{max}$ 300 m$\mu$ ($\epsilon$ 32,600); IR (liquid) 5.79$\mu$ (CF=CF); F$^{19}$ NMR (CCl$_3$F) $\delta$ 68.1 p.p.m. (d., 21 Hz. to d., 11 Hz., CF$_3$), 133.2 p.p.m. (d., 139 Hz., to quartet, 21 Hz., $\alpha$F), 165.7 p.p.m. (d., 139 Hz. to quartet, 11 Hz., F); H$^1$ NMR (CCl$_3$F) $\tau$ 2.57 (m., 2H), $\tau$ 3.28 (d., J=9 Hz., 1H), 6.28 (s., CH$_3$).

Analysis.—Calcd. for C$_{10}$H$_6$BrF$_5$O (percent): C, 37.88; H, 1.91; Br, 25.21; F, 29.96. Found (percent): C, 38.55; H, 2.07; Br, 25.05; F, 29.69.

A 16.0 g. sample of trans-1-(p-methoxyphenyl)-pentafluoropropene was added dropwise to a solution of 0.16 mole of phenylthithium in 80 ml. of 75/25 benzene-ether at 25°. The reaction mixture was stirred for 20 hours and then mixed with 100 ml. of aqueous 10% hydrochloric acid. The organic layer was separated, washed with water, dried (MgSO₄) and then distilled. A 9 g. sample of a fraction boiling between 140–155° (0.25 mm.) was obtained as a dark, very viscous syrup. This sample was chromatographed over Al₂O₃ using pentane and ether-pentane. The fraction that eluted first was evaporated to give 1.0 g. of trans-1-(trifluoromethyl)-2-(p-methoxyphenyl)-1,2-diphenylethylene as a colorless crytalline solid: M.P. 60–65°; F¹⁹ NMR (CCl₃F) δ 55.9 p.p.m. (s); UV (ethanol) λmax 287 mμ (ε 10,100) and 235 mμ (ε 19,600).

*Analysis.*—Calcd. for C₂₂H₁₇F₃O (percent): C, 74.56; H, 4.84; F, 16.09. Found (percent): C, 75.36; H, 5.34; F, 15.68.

Fractions that were eluted later were combined and evaporated to give a total of 5.2 g. of light yellow solid that was composed of 67% of the trans isomer mixed with 33% of the cis isomer, as determined by F¹⁹ NMR electronic integration.

EXAMPLE 5

1-(trifluoromethyl - 1,2 - di(p - methoxyphenyl)-2-phenylethylene (X=H; Y=OCH₃; R_f=CF₃; Ar=p-methoxyphenyl)

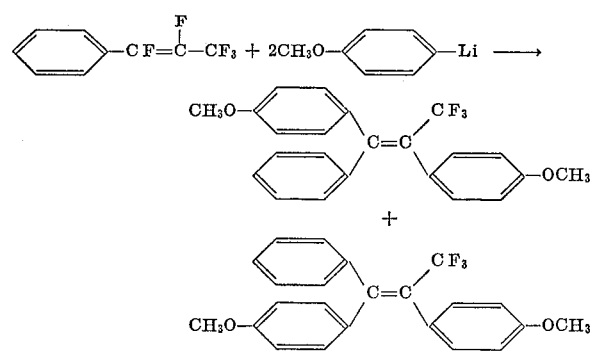

A 62 g. sample of p-bromoanisole (0.33 mole) was added dropwise at room temperature to a solution of 0.25 mole of butyllithium in 156 ml. of hexane and 200 ml. of ether.

The reaction mixture was stirred at room temperature for 45 min., and then 16.9 g. (0.083 mole) of 1-phenylpentafluoropropene was added dropwise over a period of 15 min. (the temperature rose to 45°). The reaction mixture was stirred for 18 hrs., and mixed with 200 ml. of aqueous 10% HCl. The organic layer was separated, washed with water, dried on MgSO₄ and distilled. A total of 15.8 g. of an extremely viscous syrup was collected in several fractions from 125° to 175° (0.2 mm.). The fraction (3.0 g.) boiling between 160–165° (0.2 mm.) was principally a mixture of the cis and trans isomers (about 50:50) of 1-(trifluoromethyl)-1,2-di(p-methoxyphenyl)-2-phenylethylene: F¹⁹ NMR (CCl₃F) δ 56.0 p.p.m. (s.) and 56.3 p.p.m. (s.); H² NMR (CCl₃F) τ 2.6–3.7 (13H), τ 6.37 (s.), 6.45 (s.), 6.46 (s.), and 6.53 (s.), total, τ 6.3–6.5, 6H); UV (ethanol) λmax 388 mμ (ε 9,600) and 235 mμ (ε 21,300).

*Analysis.*—Calcd. for C₂₃H₁₉F₃O₂ (percent): C, 71.86; H, 4.98; F, 14.83. Found (percent): C, 68.99; H, 4.91; F, 14.19.

EXAMPLE 6

1-(trifluoromethyl)-2,2-di-(p-methoxyphenyl)-1-phenylethylene (X=Y=H; H_f=CF₃; Ar=C₆H₅)

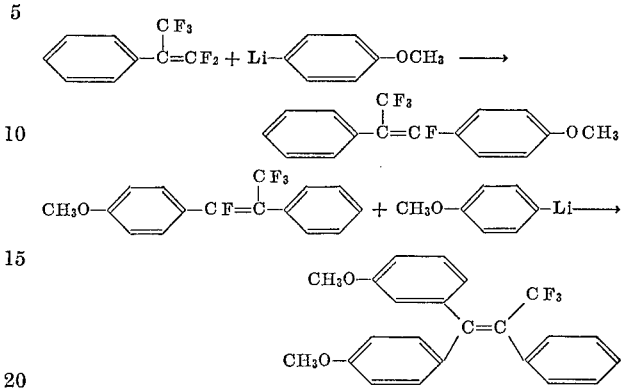

A 48 g. sample (0.25 mole) of p-bromoanisole was added dropwise to a solution of 0.225 mole of butyllithium in 280 ml. of 50/50 hexane-ether. The reaction mixture was stirred at room temperature for one hour; then, 15.6 g. (0.075 mole) of 2-phenylpentafluoropropene was added dropwise at 0° over a period of 30 min. The reaction mixture was stirred at 0° for 1 hr., and mixed with 150 ml. of 10% HCl. The organic layer was separated, washed with water, dried on MgSO₄ and distilled to give 10.1 g. of a colorless liquid, B.P. 115–120° (0.1 mm.), which partially solidified on cooling. Filtration gave 2.6 g. of solid and 7.4 g. of liquid, n_D²⁵ 1.5435.

The solid fraction was recrystallized from pentane to give trans - 1-(p-methoxyphenyl)-2-phenyltetrafluoropropene as a colorless solid: M.P. 63–65°; UV (ethanol) λmax 262 mμ (ε 17,900); IR (KBr) 5.89μ (C=CF); F¹⁹ NMR (CCl₃F) δ 56.4 p.p.m. (d., J=12 Hz., CF₃), 76.7 p.p.m. (quartet, J=12 Hz., =CF); H¹ NMR (CCl₃F) τ 2.3–3.3 (m., 9H), 6.30 (s., CH₃).

*Analysis.*—Calcd. for C₁₆H₁₂F₄O (percent): C, 64.86; H, 4.09; F, 25.65. Found (percent): C, 64.95; H, 4.24; F, 25.72.

The NMR spectra of the liquid fraction indicated it to be a mixture of 38% trans isomer and 62% cis isomer of 1-(p-methoxyphenyl)-2-phenyltetrafluoropropene: F¹⁹ NMR (CCl₃F) δ 58.1 p.p.m. (d., J=24 Hz., CF₃) and δ 93.0 p.p.m. (quartet, J=24 Hz., =CF) in addition to absorption due to the trans isomer; H² NMR (CCl₃F) τ 2.4–3.6 (m., 9H) and τ 6.57 (s., CH₃) in addition to absorption due to the trans isomer; UV (ethanol) λmax 273 mμ (16,300); IR (liquid) 6.01μ (C=CF).

*Analysis.*—Calcd. for C₁₆H₁₂F₄O (percent): C, 64.86; H, 4.09; F, 25.65. Found (percent): C, 64.99; H, 4.59; F, 25.72.

A solution of 5.93 g. (0.02 mole) of the mixture of cis and trans-1-(p-methoxyphenyl)-2-phenyltetrafluoropropene in 15 ml. of ether was added dropwise to a stirred solution of 0.02 mole of p-methoxyphenyllithium solution (prepared from 18 ml. of 1.65 M butyllithium in hexane and 5.61 g. p-bromoanisole in 5 ml. of ether) at room temperature. After the addition, the reaction mixture was stirred for two hours and mixed with 100 ml. of 5% HCl. The organic layer was separated, washed with water, dried on MgSO₄ and then distilled to give 1.1 g. of 1-(trifluoromethyl)-2,2-di-(p-methoxyphenyl)-1-phenylene as a viscous orange syrup: B.P. 147–166° (0.25 mm.); UV (ethanol) λmax 270 mμ (ε 13,400) and 235 mμ (ε 16,700); F¹⁹ NMR (CCl₃F) δ 55.8 p.p.m. (s.) with impurity peaks at 56.3, 56.6, 58.3, 58.6, and 58.8 p.p.m.; H¹ NMR (CCl₃F) τ 2.6–3.7 (m., 13H), τ 6.32 (s., 3H, CH₃) and τ 6.50 (s., 3H, CH₃).

*Analysis.*—Calcd. for C₂₃H₁₉F₃O₂ (percent): C, 71.86; H, 4.98; F, 14.83. Found (percent): C, 70.84; H, 4.83; F, 15.04.

EXAMPLE 7

1-(trifluoromethyl)-1-(p-methoxyphenyl)-2,2-diphenylethylene (X=Y=H·R₁=CF₃ Ar=p-methoxyphenyl)

(a)
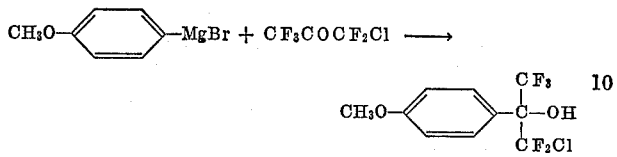

A 70-ml. sample of chloropentafluoroacetone was distilled into a stirred solution of 0.5 mole of p-methoxyphenylmagnesium bromide in 400 ml. of ether. The reaction mixture was stirred at 25° for 1 hr., and mixed with 300 ml. of aqueous 10% hydrochloric acid. The organic layer was separated, washed with water, dried on MgSO₄, and distilled to give 94 g. (65%) of α-(chlorodifluoromethyl)-p-methoxy-α-(trifluoromethyl)benzyl alcohol as a colorless liquid, B.P. 120–135° (8 mm.), which solidified on cooling, M.P. 78–80°. Recrystallization from hexane gave colorless crystals: M.P. 80–81°; F¹⁹ NMR (CCl₃F) δ 62.3 p.p.m. (quartet, J=11 Hz., 2F) and 74.1 p.p.m. (triplet, J=11 Hz., 3F).

*Analysis.*—Calcd. for C₁₀H₈ClF₅O₂ (percent): C, 41.33; H, 2.77; Cl, 12.20; F, 32.69. Found (percent): C, 41.89; H, 2.81; Cl, 12.37; F, 32.61.

(b)
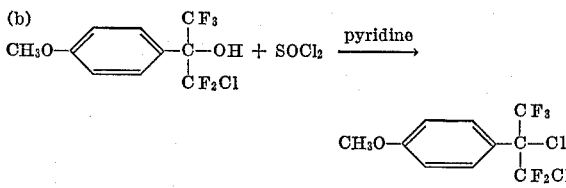

A solution of 83 g. (0.285 mole) of this benzyl alcohol in 83 ml. of thionyl chloride containing 5 ml. of pyridine was heated at reflux for 54 hrs., and then distilled to give 60.45 g. (69%) of p-[1,2-dichloro-2,2-difluoro-1-(trifluoromethyl)ethyl]anisole as a very light yellow liquid: B.P. 101–102° (4 mm.) n_D²⁵ 1.4680; F¹⁹ NMR (CCl₃F) δ 56.6 p.p.m. (m., 2F) and 68.4 p.p.m. (triplet, J=12 Hz., 3F).

*Analysis.*—Calcd. for C₁₀H₇Cl₂F₅O (percent): C, 38.86; H, 2.28; Cl, 22.94; F, 30.74. Found (percent): C, 38.92; H, 1.99; Cl, 22.65; F, 30.13.

(c)
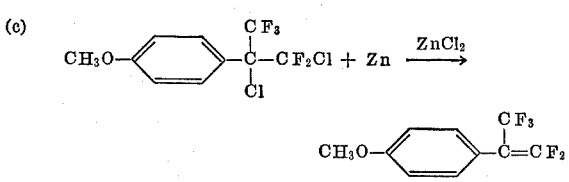

A solution of 51 g. (0.165 mole) of the dichloro compound in 50 ml. of methanol was added dropwise over a period of 30 min. to a stirred suspension of 20 g. of zinc dust and 1.0 g. zinc chloride in 200 ml. of methanol. The reaction mixture was filtered, and the filtrate was mixed with water and extracted with two 50-ml. portions of CCl₃F. The extracts were combined, washed with water, dried on MgSO₄, and distilled to give 32.3 g. (82%) of β,β-difluoro-p-methoxy-α-(trifluoromethyl)styrene as a colorless liquid: B.P. 75–76° (9 mm.); n_D²⁵ 1.4438; IR (liquid) 5.76μ (C=CF₂); F¹⁹ NMR (CCl₃F) δ 60.2 p.p.m. (d., J=24 Hz. of d., J=11 Hz., 3F), 77.4 p.p.m. (quartet, J=24 Hz. of d., J=15 Hz., 1F) and 79.2 p.p.m. (d., J=15 Hz. of quartets, J=11 Hz., 1F).

*Analysis.*—Calcd. for C₁₀H₇F₅O (percent): C, 50.43; H, 2.96; F, 39.89. Found (percent): C, 50.54; H, 2.95; F, 39.86.

(d)
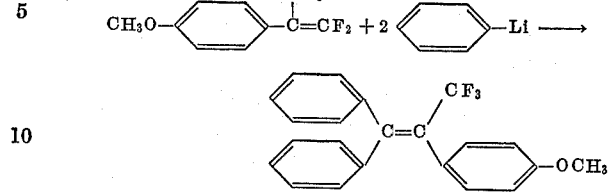

A solution of 10.4 g. (0.0437 mole) of the styrene in 10 ml. of ether was added dropwise over a period of 1 hr. to a solution of 0.1 mole of phenyllithium in 63 ml. of ether-hexane (30/70) cooled to 10°. The reaction mixture was warmed to 25° and mixed with 50 ml. of aqueous 10% hydrochloric acid. The organic layer was separated, washed with water, dried on MgSO₄ and distilled to give 5.37 g. of 1-(trifluoromethyl)-1-(p-methoxyphenyl)-2,2-diphenylethylene as an orange liquid, B.P. 158–160° (0.25 mm.), which solidified on cooling. Recrystallization from hexane gave 4.40 g. of colorless needles: M.P. 100–101°; UV (ethanol) λ_max 282 mμ (ε 8,250) and 232 mμ (ε 21,200); F¹⁹ NMR (CCl₃F) δ 57.0 p.p.m. (s.); H¹ (CCl₃F) τ 2.7–3.5 (m., 14H) and τ 6.40 (s., 3H).

*Analysis.*—Calcd. for C₂₂H₁₇F₃O (percent): C, 74.56; H, 4.84; F, 15.68. Found (percent): C, 73.86; H, 4.84; F, 16.02.

EXAMPLE 8

1-(trifluoromethyl)-1-(p-fluorophenyl)-2,2-diphenylethylene (X=Y=H; R_f=CF₃; Ar=p-fluorophenyl)

(a)
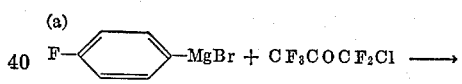

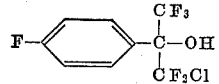

A 70-ml. sample of chloropentafluoroacetone was distilled into a stirred solution of 0.5 mole of p-fluorophenylmagnesium bromide in 400 ml. of ether. This reaction mixture was stirred at 25° for 1 hr. and mixed with 300 ml. of aqueous hydrochloric acid. The ether layer was separated, washed with water, dried on MgSO₄ and distilled to give 78.0 g. (56%) of α-chlorodifluoromethyl)-p-fluoro-α-(trifluoromethyl)benzyl alcohol as a colorless liquid: B.P. 75–76° (9 mm.); n_D²⁵ 1.4305; IR (liquid) 2.78μ (OH); F¹⁹ NMR (CCl₃F) δ 62.2 p.p.m. (m., 2F), 73.8 p.p.m. (t., J=11 Hz., 3F) and 111.6 p.p.m. (m., 1F).

*Analysis.*—Calcd. for C₉H₅ClF₆O (percent): C, 38.80; H, 1.81; Cl, 12.73; F, 40.92. Found (percent): C, 38.93; H, 2.13; Cl, 12.28; F, 40.72.

(b)
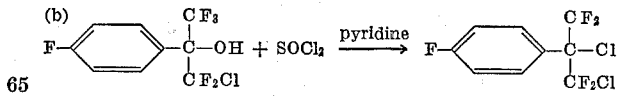

A solution of 70 g. (0.25 mole) of the benzyl alcohol and 5 ml. pyridine in 66 g. (0.55 mole) of thionyl chloride was heated at reflux for 3 days and then distilled to give 56.9 g. (77%) of 1,2-dichloro-1,1,3,3,3-pentafluoro-2-(p-fluorophenyl)propane as a colorless liquid: B.P. 73–74° (8.0 mm.); n_D²⁵ 1.4394; F¹⁹ NMR (CCl₃F) δ 56.4 p.p.m. (d., J=166 Hz. to quartets, J=12 Hz., 1F), 57.0 p.p.m. (d., J=166 Hz. to quartets, J=12 Hz., 1F), 68.3 p.p.m. (t., J=12 Hz., 3F) and 110.2 p.p.m. (m., 1F).

*Analysis.*—Calcd. for C₉H₄Cl₂F₆ (percent): C, 36.39; H, 1.36; Cl, 23.88; F, 38.38. Found (percent): C, 36.69; H, 1.42; Cl, 23.92; F, 38.19.

(c) 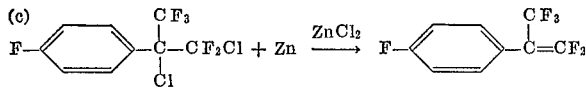

A solution of 50.5 g. (0.17 mole) of the dichloro compound in 50 ml. of methanol was added dropwise over a period of 30 min. to a stirred suspension of 20 g. (0.30 mole) of zinc dust and 1.0 g. of zinc chloride in 200 ml. of methanol. The temperature rose to 50°. The reaction mixture was stirred for 1 hr., and then filtered. The filtrate was mixed with water and extracted two times with 50-ml. portions of CCl₃F. The combined extracts were dried over MgSO₄ and then distilled to give 29.7 g. (77%) of p,β,β-trifluoro-α-(trifluoromethyl)styrene as a colorless liquid: B.P. 134.5–135°; $n_D^{25}$ 1.4100; IR (liquid) 5.73μ (C=CF₂); UV (ethanol) λ_max 267 mμ (ε 287) and 261 mμ (ε 330); F¹⁹ NMR (CCl₃F) δ 60.1 p.p.m. (d., J=24 Hz. to d., J=11 Hz., 3F), 76.5 p.p.m. (quartet, J=24 Hz. to d., J=13 Hz., 1F), 78.4 p.p.m. (d., J=13 Hz. to quartets, J=11 Hz., 1F) and 117.4 p.p.m. (m., 1F).

*Analysis.*—Calcd. for C₉H₄F₆ (percent): C, 47.80; H, 1.78; F, 50.42. Found (percent): C, 47.57; H, 1.79; F, 49.47.

(d) 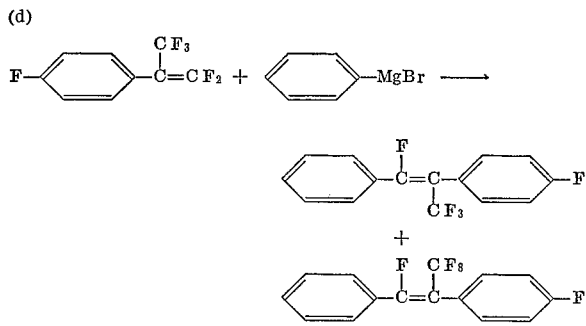

A 22.6 g. sample of the styrene was mixed with 50 ml. (0.15 mole) of a 3-molar solution of phenylmagnesium bromide in ether, and the reaction mixture was stirred for 20 hrs. at 25°. The reaction mixture was then poured into 50 ml. of aqueous 10% hydrochloric acid, and the ether layer was separated, washed with water, dried on MgSO₄, and distilled to give 14.0 g. of a mixture of cis and trans-4,α'-difluoro-α-(trifluoromethyl)stilbene as a semisolid mass, B.P. 80–89° (0.25 mm.). The solid portion was recrystallized twice from pentane to give 5.31 g. of the cis isomer as colorless needles: M.P. 67–69°; UV (ethanol) λ_max 254 mμ (ε 10,300); F¹⁹ NMR (CCl₃F) δ 59.2 p.p.m. (d., J=24 Hz., 3F), 91.7 p.p.m. (quartet, J=24 Hz., 1F) and 112.1 p.p.m. (m., 1F); IR (KBr) 6.03μ (C=CF).

*Analysis.*—Calcd. for C₁₅H₉F₅ (percent): C, 63.38; H, 3.19; F, 33.43. Found (percent): C, 63.46; H, 3.18; F, 33.35.

The liquid portion was redistilled to give 6.50 g. of the trans isomer as a colorless liquid: B.P. 87–89° (0.25 mm.); $n_D^{25}$ 1.5150; UV (ethanol) λ_max 240 mμ (ε 12,800); IR (liquid) 6.01μ (C=CF); F¹⁹ NMR (CCl₃F) δ 56.6 p.p.m. (d., J=11 Hz., 3F), 76.2 p.p.m. (quartet, J=11Hz., 1F), 112.7 p.p.m. (m., 1F).

*Analysis.*—Calcd. for C₁₅H₉F₅ (percent): C, 62.38; H, 3.19; F, 33.43. Found (percent): C, 63.11; H, 3.16; F, 33.28.

(e) 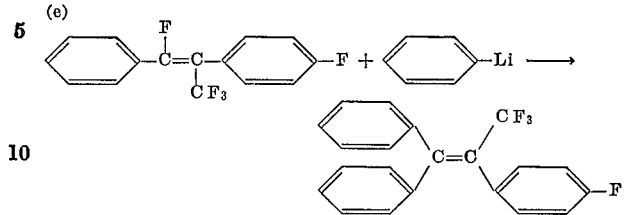

A solution of 0.02 mole of phenyllithium in 10 ml. of benzene-ether (70/30) was added dropwise to a stirred solution of 5.68 g. (0.02 mole) of 4,α'-difluoro-α-(trifluoromethyl)stilbene in 25 ml. of ether at 25°. The reaction mixture was stirred for 1 hr. and poured into 100 ml. of 10% hydrochloric acid. The organic layer was separated, washed with water, dried on MgSO₄ and distilled to give 2.1 g. of colorless liquid, B.P. 127–131° (0.3 mm.) which solidified on cooling. Two recrystallizations from pentane gave 1.71 g. (25%) of 1-(trifluoromethyl)-1-(p-fluorophenyl)-2,2-diphenylethylene as colorless crystals: M.P. 77–79°; UV (ethanol) λ_max 276 mμ (ε 8,000), 225 mμ (ε 19,000); F¹⁹ NMR (CCl₃F) δ 56.5 p.p.m. (s., CF₃) and 113.6 p.p.m. (m., 1F).

*Analysis.*—Calcd. for C₂₁H₁₄F₄ (percent): C, 73.68; H, 4.12; F, 22.20. Found (percent): C, 73.13; H, 4.19; F, 22.18.

EXAMPLE 9

Trans-4-fluoro-4'-methoxy-α'-phenyl-α-(trifluoromethyl) stilbene (X=H; Y=OCH₃; R_f=CF₃; Ar=C₆H₅)

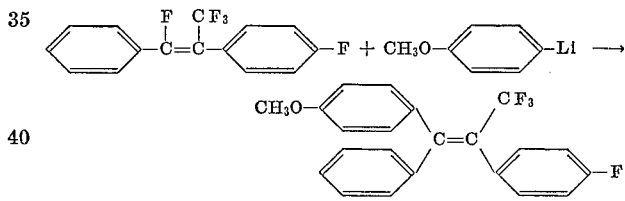

A solution of 3.74 g. (0.2 mole) of p-bromoanisole in 10 ml. of ether was added dropwise to a solution of 0.016 mole of butyllithium in 10 ml. of hexane, and the reaction mixture was stirred for 1 hr. at 25°. A solution of 4.26 g. (0.015 mole) of cis-4,α'-difluoro-α-trifluoromethylstilbene in 10 ml. of ether was added dropwise to the reaction mixture, and the resulting mixture was stirred at 25° for 2 hrs. and then mixed with 25 ml. of 10% hydrochloric acid. The organic layer was separated, washed with water, dried on MgSO₄ and distilled to give 1.21 g. of colorless liquid, B.P. 140–155° (0.3 mm.) which solidified upon cooling. Recrystallization from pentane gave 0.90 g. of trans-4-fluoro-4'-methoxy-α'-phenyl-α-(trifluoromethyl)stilbene as colorless prisms: M.P. 125–127°; UV (ethanol) λ_max 282 mμ (ε 10,900) and 232 mμ (ε 20,800); F¹⁹ NMR (acetone d. 6) δ 55.8 p.p.m. (s., 3F) and δ 114.3 p.p.m. (m., 1F); H¹ NMR (acetone-d. 6) τ 2.5–3.2) (m., 13H) and τ 6.20 (s., 3H).

*Analysis.*—Calcd. for C₂₂H₁₆F₄O (percent): C, 70.96; H, 4.33; F, 20.41. Found (percent): C, 70.31; H, 4.46; F, 20.33.

EXAMPLE 10

1-(trifluoromethyl)-1-[m-(trifluoromethyl)phenyl]-2,2-diphenylethylene (X=Y=H; R_f=CF₃; Ar=m-CF₃-phenyl)

(a) 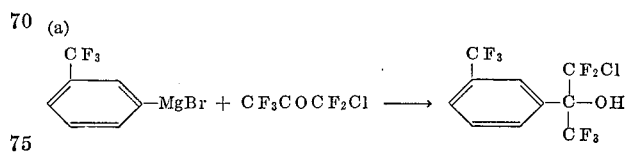

A 48 ml. sample (measured at −78°) of chloropentafluoroacetone was distilled into a stirred solution of 0.48 mole of m-(trifluoromethyl)phenylmagnesium bromide in 200 ml. of ether. The temperature was kept at about 25° by cooling in ice water. The reaction mixture was stirred 30 minutes at room temperature, then mixed with 300 ml. water containing 60 ml. conc. HCl. The organic layer was separated and the aqueous layer extracted with ether. The combined extracts were dried over $MgSO_4$ and distilled to give (after redistillation at B.P. 75–6°, 9 mm. Hg) 41.5 g. (30% of α - (chlorodifluoromethyl) - α,m-bis(trifluoromethyl)benzyl alcohol: $H^1$ NMR 2.14τ (multiplet, 4H), 6.43τ (s., 1H); $F^{19}$ NMR ($CCl_3F$) δ 73.9 p.p.m. (t, J=11.0 Hz., 3F), 63.7 p.p.m. (s., 3F), 62.5 p.p.m. (multiplet, 2F).

*Analysis.*—Calcd. for $C_{10}H_5OClF_8$ (percent): C, 36.54; H, 1.54; Cl, 10.79; F, 46.26. Found (percent): C, 36.55; H, 1.45; Cl, 10.49; F, 46.13.

(b)

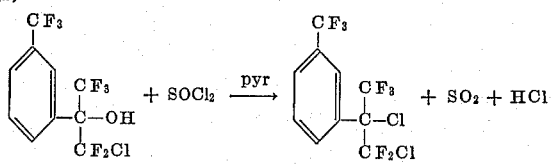

A solution of 36.4 g. (0.11 mole) of this benzyl alcohol in 25 ml. thionyl chloride containing 1 ml. pyridine was refluxed for 7 days. The mixture was cooled and water was added dropwise to decompose the $SOCl_2$. The organic layer was separated and the water layer washed with $CCl_3F$. The combined organic extracts were dried on $MgSO_4$ and distilled to give 31.1 g. (81%) α-(chlorodifluoromethyl)-α,m-bis(trifluoromethyl)benzyl chloride as a pale yellow liquid: B.P. 67–8° (8.3 mm.); $F^{19}$ NMR ($CCl_3F$) δ 63.8 p.p.m. (s., 3F); δ 68.3 p.p.m. (t., J=11.5 Hz., 3F), ($ABX_3$ pattern, $J_{AB}$=166 Hz., $J_{AX}$=$J_{BX}$=11.5 Hz.; $\Delta\nu_{AB}$=189 Hz., 2H).

*Analysis.*—Calcd. for $C_{10}H_4Cl_2F_8$ (percent): C, 34.61; H, 1.16; Cl, 20.43; F, 43.80. Found (percent): C, 34.15; H, 1.00; F, 44.32.

(c)

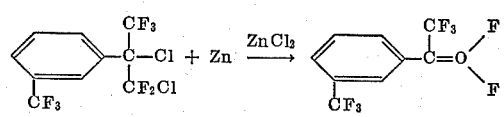

A solution of 25.6 g., (0.0738 mole) of the benzyl chloride in 50 ml. THF was added dropwise with stirring to 20 g. zinc dust and 2 g. $ZnCl_2$ in 250 ml. THF. The mixture was refluxed 1 hour, cooled, filtered, mixed with water, and the product was extracted with $CCl_3F$. The extracts were dried on $MgSO_4$ and distilled to give 15.6 g. (64% of β,β-difluoro-m,α-bis(trifluoromethyl)styrene as a colorless liquid: B.P. 141–2°; $F^{19}$ NMR ($CCl_3F$) δ 60.1 p.p.m. (quartet, $J_{AX}$=11 Hz., $J_{BX}$=23 Hz., 3F); δ 64.0 p.p.m. (s., 3F) δ 75.6 p.p.m. (m., 1F); δ 77.7 p.p.m. (quintet, 1F).

*Analysis.*—Calcd. for $C_{10}H_4F_8$ (percent): C, 43.50; H, 1.46; F, 55.04. Found (percent): C, 43.98; H, 1.81; F, 54.97.

(d)

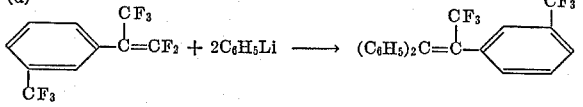

A solution of 0.092 mole of phenyllithium in 43 ml. of ether-benzene was added dropwise to a solution of 12.75 g. (0.046 mole) of β,β-difluoro-m,α-bis(trifluoromethyl)styrene in 75 ml. of ether cooled to 5–10° in an ice-bath. The reaction mixture was stirred for one hour at 25°, and mixed with 100 ml. of 5% hydrochloric acid. The organic layer was separated, washed with water, dried on $MgSO_4$ and distilled to give 8.2 g. of a dark oil, B.P. 128–130° (0.8 mm.) Chromatography on alumina with pentane and recrystallization from pentane gave 5.74 g. (32%) of 1 - (trifluoromethyl) - 1-[m-(trifluoromethyl)phenyl]-2,2-diphenylethylene as colorless crystals: M.P. 83–85°; UV (ethanol) $\lambda_{max}$ 263 mμ (ε 8,600) and 223 mμ (ε 19,600); $F^{19}$ NMR ($CCl_3F$) δ 56.3 p.p.m. (s.) and 63.7 p.p.m. (s.) from $CCl_3F$.

*Analysis.*—Calcd. for $C_{22}H_{14}F_6$ (percent): C, 63.35; H, 3.60; F, 29.06. Found (percent): C, 63.53; H, 3.63; F, 29.21.

EXAMPLE 11

1 - (Trifluoromethyl) - 1-[p-(perfluoroisopropyl)phenyl]-2,2-diphenylethylene (X=Y=H; $R_f$=$CF_3$, Ar=p-perfluoroisopropylphenyl)

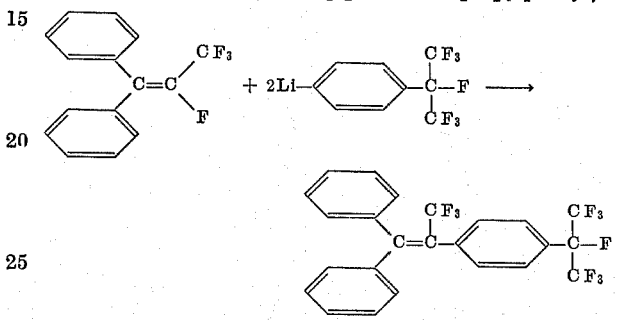

A solution of 0.04 mole of butyllithium in hexane (25 ml. total volume) was mixed with 25 ml. of ether and cooled to 0°. To this solution was added dropwise a solution of 14.3 g. (0.044 mole) of p-bromo(perfluoroisopropyl)benzene [W. A. Sheppard, J. Am. Chem. Soc. 87, 2410 (1965)] in 25 ml. of ether. The reaction mixture was stirred for 30 min. at 0–10°, and 9.0 g. of 1,1-diphenyl-2,3,3,3-tetrafluoropropene was added dropwise over eight minutes at 5–10°. The reaction was stirred for 18 hrs. at 25° and filtered. The filtrate was distilled to give 11.1 g. of 1-(trifluoromethyl)-1-[(p-perfluoroisopropyl)phenyl]-2,2-diphenylethylene as a colorless viscous liquid, B.P. 128–129° (0.4 mm.) that solidified on cooling to a white solid: M.P. 60–62°; UV. (ethanol) $\lambda_{max}$ 267 mμ (ε 9,400) and 225 mμ (20,200); $F^{19}$ NMR ($CCl_3F$) δ 55.9 p.p.m. (s., $CF_3$), 76.2 (d., 7 Hz., $2CF_3$) and 182.9 (septet, 7 Hz., 1F).

*Analysis.*—Calcd. for $C_{24}H_{14}F_{10}$ (percent): C, 58.54; H, 2.87; F, 38.59. Found (percent): C, 58.73; H, 3.14; F, 38.57.

EXAMPLE 12

Preparation of 1 - (trifluoromethyl) - 1-(p-chlorophenyl)-2,2 - diphenylethylene (X=Y=H; $R_f$=$CF_3$, Ar=p-Cl-phenyl)

(a)

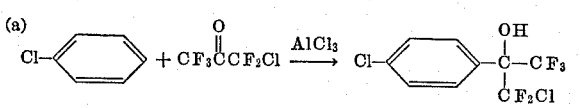

A Hastelloy®-lined bomb, charged with 360 ml. (392 g., 3.5 mole) chlorobenzene, 7.0 g. anhydrous $AlCl_3$ and 160 g. (0.877 mole) chloropentafluoroacetone was heated for 8 hr. at 200°. The cooled mixture was filtered and distilled twice, the second time through a spinning band, to give 100.6 g. (39%) of a pale yellow liquid, p-chloro-α-(chlorodifluoromethyl) - α - (trifluoromethyl)benzyl alcohol: B.P. 84° (6.2 mm.); $F^{19}$ NMR ($CCl_3F$) δ 62.2 p.p.m. (2 quartets, J=11.5 Hz., 2F), 73.7 p.p.m. (triplet, J=11.5 Hz., 3F).

*Analysis.*—Calcd. for $C_9H_5OCl_2F_5$ (percent): C, 36.65; H, 1.71; Cl, 24.03; F, 32.20. Found (percent): C, 36.35; H, 1.90; Cl, 23.82; F, 31.64.

(b)

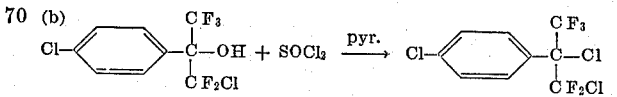

A mixture of 78.6 g. (0.266 mole) of the benzyl alcohol, 100 ml. thionyl chloride and 3 ml. pyridine was refluxed 96 hr. The cooled mixture was mixed with water and extracted with CCl₃F. The organic layer was washed with 5% NaOH and water to remove unreacted alcohol, then distilled to yield 42.9 g. (49.6%) p-chloro-α-(chlorodifluoromethyl) - α - (trifluoromethyl)benzyl chloride: B.P. 91° (7.8 mm.); F$^{19}$ NMR (CCl₃F) δ 55.1 p.p.m. (m., 2F) and 68.3 p.p.m. (triplet, $J=12$ Hz., 3F).

Analysis.—Calcd. for C₉H₄Cl₃F₅ (percent): C, 34.46; H, 1.29; F, 30.29; Cl, 33.96. Found (percent): C, 34.69; H, 1.21; F, 30.39; Cl, 34.10.

(c) 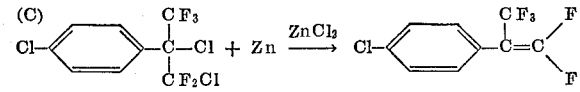

A solution of 19.5 g. of this benzyl chloride in 25 ml. methanol was added dropwise to 10 g. Zn dust and 1 g. ZnCl₂ in 75 ml. methanol with stirring. The mixture was stirred 1 hr. at room temperature and filtered. The filtrate was mixed with water and extracted with CCl₃F. The organic extracts were dried on MgSO₄ and distilled to give 10.7 g. (73%) of p-chloro-α-(trifluoromethyl)-β,β-difluorostyrene: B.P. 63–6° (20 mm.); F$^{19}$ NMR δ 75.9 p.p.m. (octet, $J=24.5$ Hz. to quartet, $J=11.0$ Hz. to quintet, 1F) 76.1 p.p.m. (quintet, $J=11.0$ Hz. to quartet, 11.0 Hz. to octet, 1F) 60.0 p.p.m. (quartet, 3F).

(d) 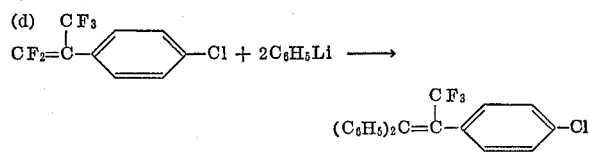

A solution of 0.14 mole of phenyllithium in ether-benzene (67 ml.) was added dropwise to a stirred solution of 17.0 g. of p-chloro-α-(trifluoromethyl)-β,β-difluorostyrene in 100 ml. of ether cooled to 5–10°. The reaction mixture was then warmed to 25° and mixed with 100 ml. of 10% hydrochloric acid. The organic layer was separated, washed with water, dried on MgSO₄ and distilled to give 10.1 g. of an orange liquid, B.P. 140–170° (0.6 mm.) which solidified on cooling. Chromatography on alumina with pentane and recrystallization from pentane gave 7.65 g. of 1-(trifluoromethyl)-1-(p-chlorophenyl)-2,2-diphenylethylene as colorless crystals: M.P. 101–102°; UV (ethanol) λ$_{max}$ 263 mµ (ε 9,250) and 226 mµ (ε 22,300); F$^{19}$ NMR (CCl₃F) δ 56.3 p.p.m. (s.).

Analysis.—Calcd. for C₂₁H₁₄ClF₃ (percent): C, 70.30; H, 3.93; Cl, 9.88; F, 15.89. Found (percent): C, 70.70; H, 4.16; Cl, 10.03; F, 15.70.

EXAMPLE 13

1-(trifluoromethyl)-1-[p-(trifluoromethyl)phenyl]-2,2-diphenylethylene (X=Y=H; R$_f$=CF₃; Ar=p-CF₃-phenyl)

(a) 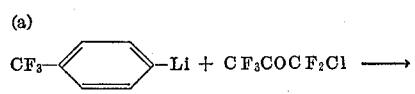

A 100 g. sample (0.445 mole) of p-bromobenzotrifluoride was added dropwise to a solution of 0.4 mole of butyllithium in 250 ml. of hexane and 400 ml. of ether cooled to 10°. The mixture was stirred at 5–10° for 3 hours, then 50 ml. of chloropentafluoroacetone (measured at −78°) was distilled into it, keeping the temperature at about 10°. Aqueous 10% hydrochloric acid, 200 ml., was added, and the organic layer was separated, washed with water, dried on MgSO₄ and distilled to give 84.75 g. (64%) of α-(chlorodifluoromethyl)-α,p-bis(trifluoromethyl)benzyl alcohol as a colorless liquid: B.P. 79–80° (10.6 mm.); $n_D^{25}$ 1.4104; F$^{19}$ NMR (CCl₃F) δ 62.4 p.p.m. (m., CF₂Cl), 63.9 (s., CF₃) and 73.8 (t., $J=11$ Hz., CF₃); H$^1$ NMR (CCl₃F) τ 2.1 (m., 4H) and τ 6.45 (s., OH).

Analysis.—Calcd. for C₁₀H₅ClF₈O (percent): C, 36.54; H, 1.54; Cl, 10.79; F, 46.26. Found (percent): C, 36.86; H, 1.61; Cl, 10.79; F, 46.31.

(b) 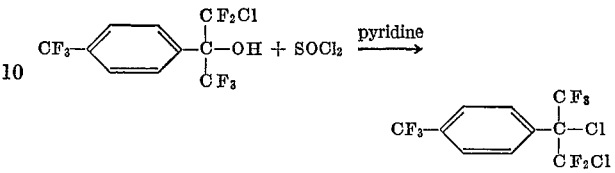

A mixture of 78 g. of this benzyl alcohol, 84 ml. of thionyl chloride, and 3 ml. of pyridine was heated at reflux for 96 hrs. The excess thionyl chloride was destroyed by slow addition of water, and the reaction mixture was extracted with 100 ml. of CCl₃F. The extract was then washed with water, dried on MgSO₄, and distilled to give 64.26 g. of a mixture of the starting benzyl alcohol and the benzyl chloride, B.P. 84–85° (15 mm.).

A 50-g. portion of this mixture was extracted twice with 50-ml. portions of 5% sodium hydroxide and dissolved in 25 ml. of CCl₃F. This solution was washed with water, dried on MgSO₄, and distilled to give 18.69 g. of α-(chlorodifluoromethyl) - α,p - bis(trifluoromethyl)benzyl chloride as a colorless liquid: B.P. 81–82° (12.8 mm.); $n_D^{25}$ 1.4192; F$^{19}$ NMR (CCl₃F) δ 64.2 p.p.m. (s. 3F) 68.1 (t., $J=12$ Hz., 3F) and 56.6 (AB portion of ABX₃ pattern with $J_{AB}=167$ Hz.).

Analysis.—Calcd. for C₁₀H₄Cl₂F₈ (percent): C, 34.61; H, 1.16; Cl, 20.43; F, 43.80. Found (percent): C, 34.85; H, 1.37; Cl, 20.05; F, 45.13.

(c) 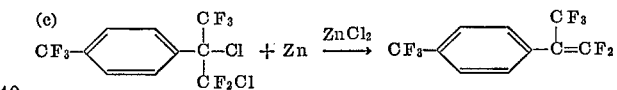

A solution of 16.3 g. (0.047 mole) of the benzyl chloride in 25 ml. of methanol was added dropwise to a suspension of 10 g. of zinc dust and 1 g. of zinc chloride in 75 ml. of methanol. The reaction mixture was cooled to keep the temperature below 50°. After the addition, the reaction mixture was stirred for 2 hours at 25° and filtered. The filtrate was mixed with water and extracted with CCl₃F. The extract was dried on MgSO₄ and distilled to give 4.73 g. (36%) of β,β-difluoro-p,α-bis(trifluoromethyl)styrene as a colorless liquid: B.P. 146–147°; $n_D^{25}$ 1.3934; F$^{19}$ NMR (CCl₃F) δ 59.7 p.p.m. (d., $J=24$ Hz. of d., $J=11$ Hz., 3F), 63.9 (s., 3F), 75.3 (d., $J=24$ Hz. of d., $J=11$ Hz., 1F) and 77.5 (d., $J=11$ Hz. of d., $J=11$ Hz., 1F).

Analysis.—Calcd. for C₁₀H₄F₈ (percent): C, 43.49; H, 1.46; F, 55.05. Found (percent): C, 43.53; H, 1.39; F, 54.95.

(d) 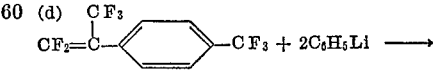

A solution of 0.022 mole of phenyllithium in benzene-ether (total volume, 11 ml.) was added dropwise to a stirred solution of 3.0 g. (0.011 mole) of β,β-difluoro-p,α-bis(trifluoromethyl)styrene in 20 ml. of ether cooled to 5–10°. The reaction mixture was warmed to 25° and mixed with 20 ml. of 5% hydrochloric acid. The organic layer was separated, washed with water, dried on MgSO₄ and evaporated to dryness. The solid residue was recrystallized twice from pentane (decolorizing charcoal) to give 1.35 g. of 1-(trifluoromethyl)-1-[p-trifluoromethyl) phenyl]-2,2-diphenylethylene as colorless crystals: M.P. 111–113°; UV (ethanol) λ_max 263 mμ (ε 8,780) and 223 mμ (ε 19,300); F¹⁹ NMR (CCl₃F) δ 56.1 p.p.m. (s., 3F) and 63.7 (s., 3F).

*Analysis.*—Calcd. for C₂₂H₁₄F₆ (percent): C, 67.35; H, 3.60; F, 29.06. Found (percent): C, 67.70; H, 3,58; F, 29.94.

EXAMPLE 14

1,1,2-triphenylperfluoro-1-butene (X=Y=H; R_f=C₂F₅; Ar=C₆H₅)

(a) A sample of 6.1 g. perfluorothiopropionyl fluoride was slowly distilled into a dry, stirred solution of diphenyldiazomethane (prepared from the reaction of 6.6 g. benzophenone hydrazone and 7.4 g. yellow mercuric oxide in pentane) at —5°. The product was distilled to give a mixture of one part 1,1-diphenylperfluoro-1-butene to 4 parts 2-fluoro-2-perfluoroethyl-3,3-diphenylthiirane as indicated by F¹⁹ NMR. Analysis: (CCl₃F) olefin, δ 83.6 p.p.m. (doublet of triplets, J=9 Hz. to multiplet, J=2.5 Hz. to quartets, 3F) 113 p.p.m. (doublet of quartets, J=13 Hz. to multiplet, 2F) 127 p.p.m. (multiplet, 1F); thiirane; δ 8.1 p.p.m. (doublet, J=13 Hz. to multiplet, 3F) 117 p.p.m. ABX pattern, 2 overlapping quartets (δ_A 114 p.p.m., J_AX=9.5 Hz.; δ_B 119 p.p.m., J_BX=12.5 p.p.m., J_AB=277 Hz., 2F) δ 148 p.p.m. (multiplet, 1F).

(b) A solution of 0.045 mole phenyllithium in 21 ml. ether-benzene was added dropwise to a solution of the above mixture in ether at 0°. The mixture was stirred 2 hr. at 0° then poured into 50 ml. 10% HCl. The organic layer was separated, washed with water and dried over MgSO₄. The solvent was evaporated and a crystalline product obtained, which was recrystallized in pentane to give 2.0 g. of 1,1,2-triphenylperfluoro-1-butene as colorless crystals: M.P. 89–90°; F¹⁹ NMR (CCl₃F), δ 81.5 p.p.m. (triplet, J=5.5 Hz., 3F) 105.6 p.p.m. (quartet, J=5.5 Hz., 2F); UV (ethanol) λ_max 262 mμ (ε 7,340) and 223 mμ (ε 20,800).

*Analysis.*—Calcd. for C₂₂H₁₅F₅ (percent): C, 70.58; H, 4.04; F, 25.38. Found (percent): C, 70.56; H, 4.12 F, 25.55.

EXAMPLE 15

Preparation of 1,1-diphenyl-2-(trifluoromethyl)-2-(m-fluorophenyl)ethylene (X=Y=H; R_f=CF₃; Ar=m-fluorophenyl)

(a)

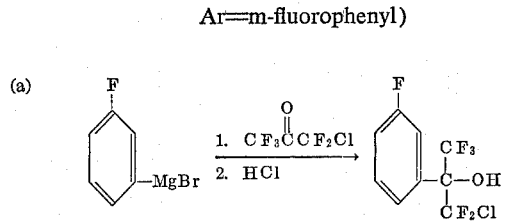

A solution of m-fluorophenylmagnesium bromide was prepared in the usual way from 95 g. (0.542 mole) m-bromofluorobenzene and 13.2 g. magnesium turnings in 300 ml. ether. A 60 ml. sample of pentafluorochloroacetone (measured at —78°) was distilled into the reaction mixture with cooling to keep the temperature between 25 and 30°. This mixture was poured into 300 ml. 10% hydrochloric acid. The organic layer was separated and the aqueous layer extracted with ether. The combined ether extracts were dried on MgSO₄ and distilled to give 56.5 g. (36%) of m-fluoro-α-(chlorodifluoromethyl)-α-(trifluoromethyl)benzyl alcohol as a colorless liquid: B.P. 72° (8.8 mm.); IR (neat) 2.76μ (—OH); H¹ (CCl₃F) 6.48τ (singlet, 1H) 2.76τ (multiplet, meta disubstitution pattern, 4H); F¹⁹ (CCl₃F) δ 62.3 p.p.m. (multiplet, ABX₃ pattern, 2F) 74.0 p.p.m. (triplet, J_AX=J_BX=11 Hz., 3F) 112 p.p.m. (multiplet, 1F).

*Analysis.*—Calcd. for C₉H₅OClF₆ (percent): C, 38.80; H, 1.81; F, 40.92; Cl, 12.73. Found (percent): C, 38.98; H, 2.01; F, 41.29; Cl, 12.82.

(b)

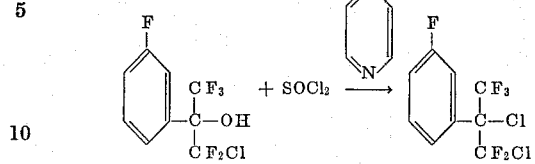

A mixture of 13.2 g. (0.0475 mole) of the benzyl alcohol, 11 ml. thionyl chloride and 0.5 ml. pyridine was refluxed for weeks, 5 ml. SOCl₂ and 0.5 ml. pyridine were added and the mixture refluxed another week. Water was added cautiously to destroy excess thionyl chloride. The organic layer was separated and the water layer extracted with CCl₃F. The organic extracts were dried (MgSO₄) and distilled to give 9.2 g. (66%) of m-fluoro-α-chlorodifluoromethyl)-α-(trifluoromethyl)benzyl chloride as a colorless liquid: B.P. 89–90° (33 mm.).

(c)

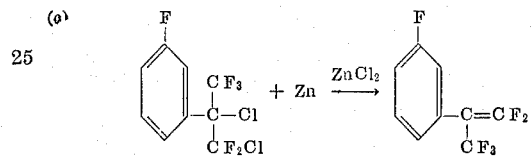

A solution of 8 g. of the m-fluorobenzyl chloride in 18 ml. of THF was added dropwise to 7.4 g. of zinc dust and 0.7 g. of zinc chloride in 90 ml. of THF. The mixture was refluxed one hour, filtered and water was added. The product was extracted with CCl₃F, the combined extracts dried over MgSO₄ and distilled to give 2.5 g. (46.8%) of 2-(m-fluorophenyl)-perfluoro-1-propene as a colorless liquid: B.P. 130–133°; F¹⁹ NMR (CCl₃F); δ 60.0 p.p.m. (2 doublets, J=25 Hz. to lower field olefinic F, J=11 Hz. to higher field olefinic F, 3F) 76.1 p.p.m. (2 overlapping quartets, J=25 Hz. to CF₃, J=12 Hz. to higher field olefinic F, 1F) 78.0 p.p.m. (quintet, 1F) 112 p.p.m. (multiplet, 1F).

*Analysis.*—Calcd. for C₉H₄F₆ (percent): F, 50.42. Found (percent): F, 50.62.

(d)

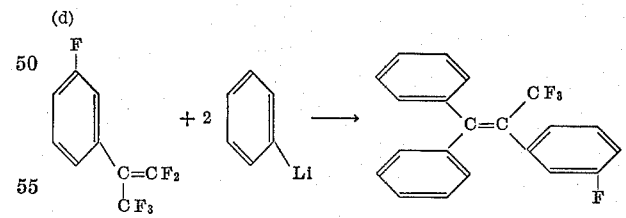

To a stirred solution of 2.6 g. (0.0115 mole) of 2-(m-fluorophenyl)-perfluoro-1-propene in 25 ml. of ether was added 0.03 mole of phenyllithium in 14 ml. of benzene-hexane. The mixture was cooled in ice water to keep the temperature between 15 and 25°. The mixture was stirred one hour at room temperature, then poured into 50 ml. of 10% HCl. The organic layer was separated, washed with water, dried over MgSO₄ and distilled to give a solid product which was recrystallized from benzene-hexane to give 1.0 g. of 1,1-diphenyl-2-(trifluoromethyl)-2-(m-fluorophenyl)ethylene as colorless crystals: B.P. 140° (0.5 mm.); M.P. 110–111°; F¹⁹ NMR (CCl₃F) δ 56.4 p.p.m. (singlet, 3F), 113 p.p.m. (multiplet, 1F).

*Analysis.*—Calcd. for C₂₁H₁₄F₄ (percent): C, 73.68; H, 4.12; F, 22.20. Found (percent): C, 73.82; H, 4.22; F, 21.90.

EXAMPLE 16

1-(trifluoromethyl)-1-(o-fluorophenyl)-2,2-diphenyl-ethylene (X=Y=H; $R_1$=$CF_3$; Ar=o—$FC_6H_4$)

(a) 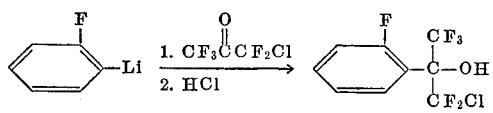

To 48 g. (0.5 mole) of fluorobenzene in 500 ml. of tetrahydrofuran was added 0.5 mole n-butyllithium in 312 ml. of hexane, keeping the temperature between —60° and —50°. This solution was stirred 6 hrs. at —70° to —50°, and a 58 ml. sample (measured at —78°) of chloropentafluoroacetone was added. The mixture was poured into 200 ml. of 10% HCl, the organic layer separated, washed with water, dried ($MgSO_4$) and distilled to give 19.9 g. (14.3%) of o-fluoro-α-(chlorodifluoromethyl)-α(trifluoromethyl)benzyl alcohol as a colorless liquid: B.P. 80–82° (8.9 mm.); $F^{19}$ NMR ($CCl_3F$) δ 73.1 p.p.m. (2 overlapping triplets, J=11.0 Hz. to $CF_2Cl$, J=15 Hz. to aromatic F, 3F) δ 62.0 p.p.m. (m., 2F); δ 112 p.p.m. (m., 1F).

*Analysis.*—Calcd. for $C_9H_5OClF_6$ (percent): C, 38.80; H, 1.81; Cl, 12.73; F, 40.92. Found (percent): C, 39.35; H, 2.13; Cl, 12.33; F, 39.39.

(b) 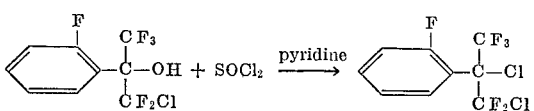

A mixture of 25 ml. of thionyl chloride, 33.3 g. (0.12 mole) of o-fluoro-α-(chlorodifluoromethyl)-α-(trifluoromethyl)-benzyl alcohol and 1 ml. of pyridine was refluxed 68 hrs. Water was added dropwise to decompose thionyl chloride; $CCl_3F$ was added and the organic layer separated, dried ($MgSO_4$) and distilled to give 28.6 g. (80%) of o-fluoro-α-(chlorodifluoromethyl)-α-(trifluoromethyl) benzyl chloride as a colorless liquid: B.P. 73–5 (7.4 mm.); $F^{19}$ NMR ($CCl_3F$): δ 55.6 p.p.m. (ABX$_3$M pattern, $J_{AB}$=167.5 Hz., $J_{AX}$=12 Hz., $J_{BX}$=12 Hz., $J_{AM}$=18 Hz., $J_{BM}$=37 Hz., $\Delta\gamma_{AB}$=157.6 Hz., δ 63.4 p.p.m. (2 overlapping triplets, $J_{MX}$=23.5, 3F); δ 102.2 p.p.m. (m., 1F).

*Analysis.*—Calcd. for $C_9H_4Cl_2F_6$ (percent): C, 36.39; H, 1.36; Cl, 23.88; F, 38.38. Found (percent): C, 36.93; H, 1.70; Cl, 22.51; F, 38.44.

(c) 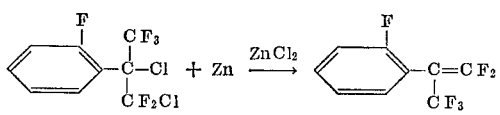

A solution of 25.0 g. of o-fluoro-α-(chlorodifluoromethyl)-α-(trifluoromethyl)benzyl chloride in 50 ml. of THF was added dropwise to 20 g. of zinc and 2 g. of $ZnCl_2$ in 250 ml. of THF. The mixture was refluxed 1 hr., cooled, filtered, poured into water and extracted with $CCl_3F$. The organic extracts were dried ($MgSO_4$) and distilled to give 13.5 g. (71%) of o-fluoro-α-(trifluoromethyl)-β,β-difluorostyrene: B.P. 130–132° (1 atm.); $F^{19}$ NMR ($CCl_3F$) 60.3 p.p.m. (4 doublets, $J_1$=7.5, $J_2$=22.5, $J_3$=43.0 Hz., 3F) δ 75.3 p.p.m. (m., 2F) δ 113 p.p.m. (m., 1F); IR (neat) 5.72μ (C=$CF_2$).

*Analysis.*—Calcd. for $C_9H_4F_6$ (percent): C, 47.76; H, 1.82; F, 50.42. Found (percent): C, 47.75; H, 1.85; F, (d) 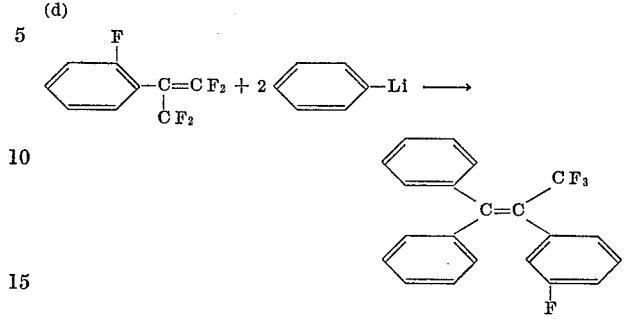

To 10 g. (0.0443 mole) of o-fluoro-α-(trifluoromethyl)-β,β-difluorostyrene in 100 ml. of ether was added 0.09 mole of phenyllithium in 42 ml. 70:30 of benzene-hexane, with cooling in ice. The mixture was stirred one hour at room temperature and poured into 200 ml. of 10% HCl. The organic layer was separated, washed with water, dried ($MgSO_4$) and distilled to give 7.7 g. (51%) of 1-(trifluoromethyl) - 1 - (o-fluorophenyl) - 2,2 - diphenylethylene: B.P. 130–137° (0.55 mm.); M.P. 84.5–86°; $F^{19}$ NMR: δ 57.3 p.p.m. (doublet, J=5 Hz., 3F), δ 112 p.p.m. (m., 1F); UV (ethanol) 261 mμ (ε 9,230), shoulder at 225 mμ (ε 18,500).

*Analysis.*—Calcd. for $C_{21}H_{14}F_4$ (percent): C, 73.68; H, 4.12; F, 22.20. Found (percent): C, 73.51; H, 4.31; F, 21.53.

Additional examples of preferred routes to other triphenylethylenes of this invention are listed in the following Table I:

TABLE I

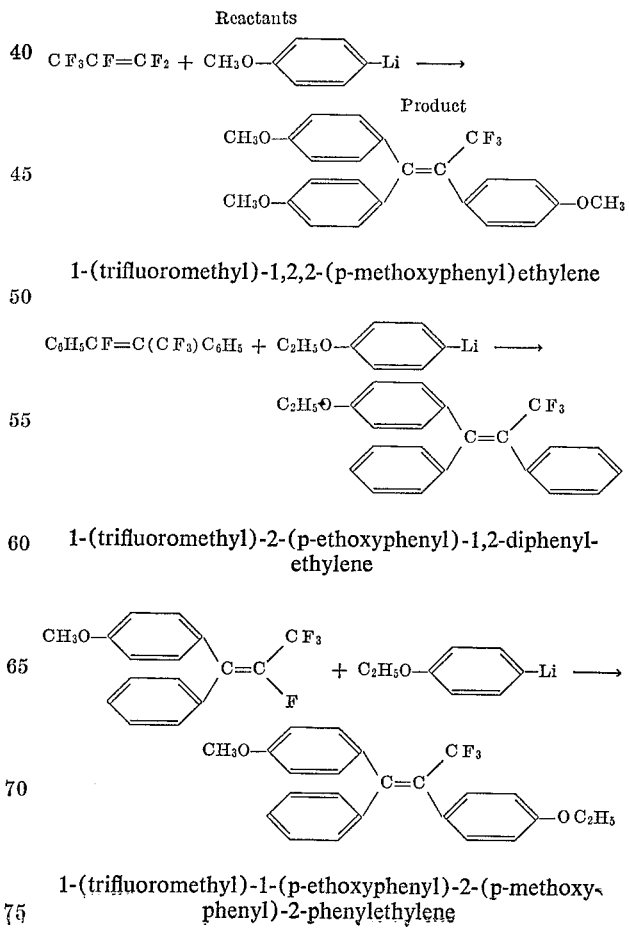

1-(trifluoromethyl)-1,2,2-(p-methoxyphenyl)ethylene 1-(trifluoromethyl)-2-(p-ethoxyphenyl)-1,2-diphenyl-ethylene 1-(trifluoromethyl)-1-(p-ethoxyphenyl)-2-(p-methoxyphenyl)-2-phenylethylene TABLE I—Continued

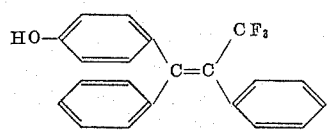

1-(trifluoromethyl)-2-[p-(N,N-diethylaminoethoxy) phenyl]-1-phenylethylene

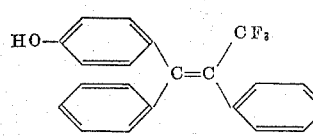

1-(trifluoromethyl)-1,2-di[(p-propionyloxy)phenyl]- 2-phenylethylene

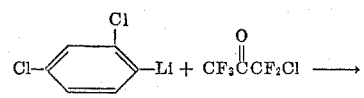

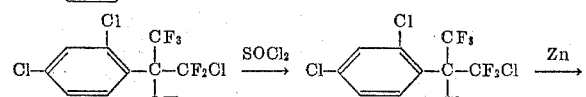

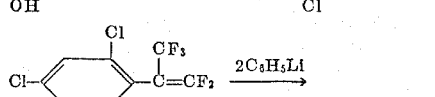

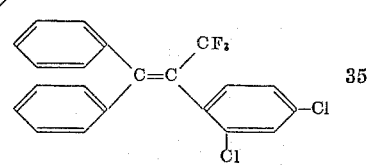

1-(trifluoromethyl)-1-(2,4-dichlorophenyl)-2,2-diphenylethylene

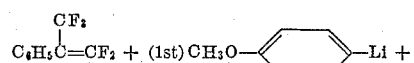

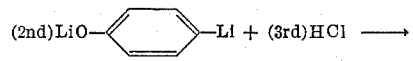

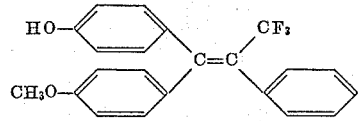

1-(trifluoromethyl)-2-(p-hydroxyphenyl)-2-(p-methoxyphenyl)-1-phenylethylene

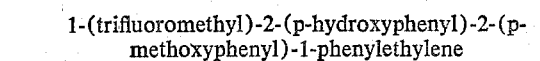

1-(trifluoromethyl)-2-(p-acetoxyphenyl)-2-(p-ethoxyphenyl)-1-phenylethylene

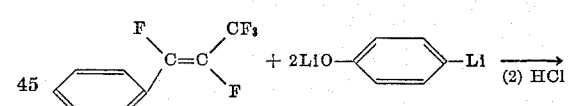

1-(trifluoromethyl)-2-(p-hydroxyphenyl)-1,2-diphenylethylene

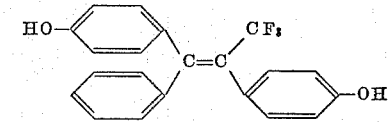

1-(trifluoromethyl)-1,2-di(p-hydroxyphenyl)-2-phenylethylene

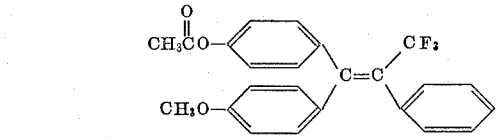

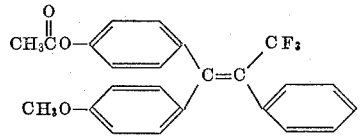

1-(trifluoromethyl)-2-(p-acetoxyphenyl)-1,2-diphenylethylene

TABLE I—Continued

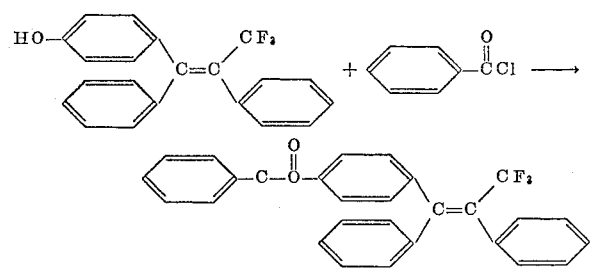

1-(trifluoromethyl)-2-(p-benzoyloxyphenyl)-1,2-diphenylethylene

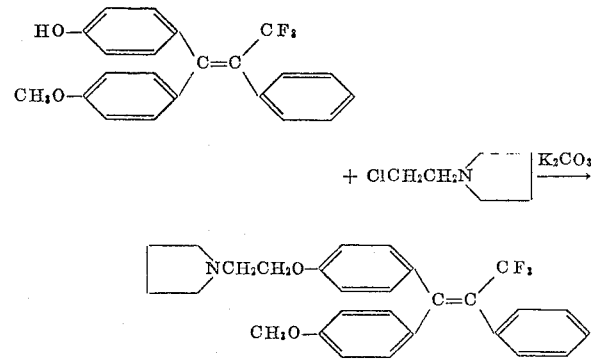

1-(trifluoromethyl)-2-(p-methoxyphenyl)-2-[p-(N-pyrrolidinoethoxyphenyl]-1-phenylethylene

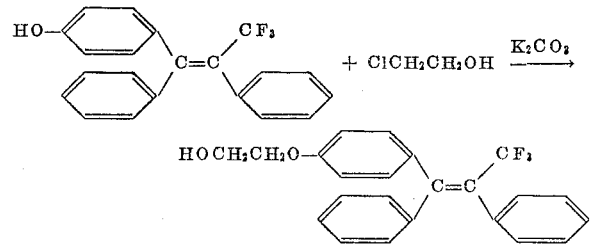

1-(trifluoromethyl)-2-[p-(2-hydroxyethoxy)phenyl]-1,2-diphenylethylene

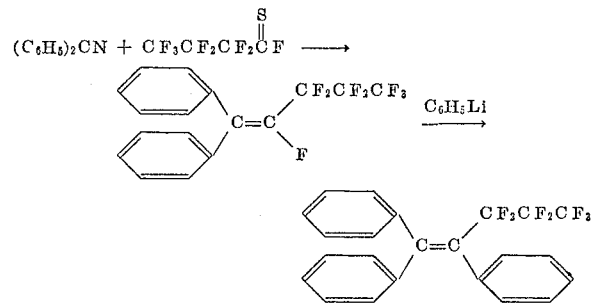

1-(heptafluoropropyl)-1,2,2-triphenylethylene

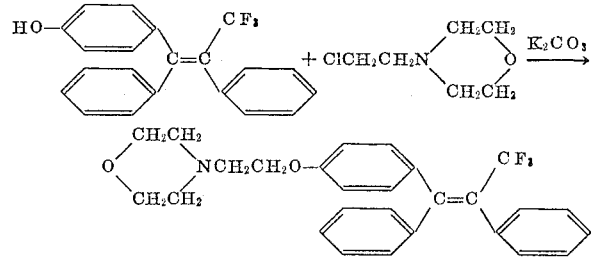

1-(trifluoromethyl)-2-[p-(N-morpholinoethoxy)phenyl]-1,2-diphenylethylene

TABLE I—Continued

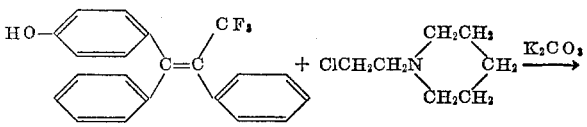

1-(trifluoromethyl)-2-[p-(N-piperidinoethoxy)phenyl]-1,2-diphenylethylene

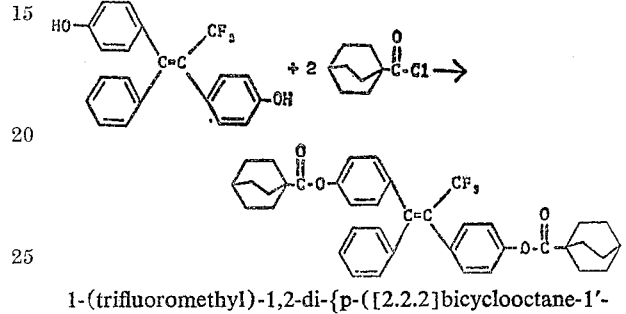

1-(trifluoromethyl)-1,2-di-{p-([2.2.2]bicyclooctane-1'-carbonyloxy)phenyl}-2-phenylethylene

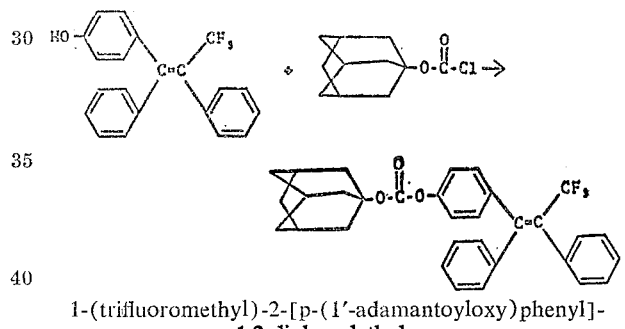

1-(trifluoromethyl)-2-[p-(1'-adamantoyloxy)phenyl]-1,2-diphenylethylene

The new compounds of this invention are useful in prevention of pregnancy in warm-blooded animals and can be administered by any suitable means. Oral administration is preferred. Administration also can be parenteral, that is subcutaneous or intramuscular, or rectal. Compounds of this invention are preferably administered in a single dose, preferably orally, after coitus but before implantation of the fertilized egg. Alternatively, single or divided doses can be administered daily during all or a substantial fraction of the estrous cycle or menstrual cycle.

Doses will ordinarily range from about 0.0005 to about 50 milligrams per kilogram of body weight of the recipient per day (mg./kg.-day). The preferred dosage range is about 0.0025 to 10 mg./kg.-day, and the most preferred range is about 0.005 to 5 mg./kg.-day.

These compounds can be employed with satisfactory results to prevent pregnancy in laboratory animals such as rats, mice, guinea pigs, rabbits, monkeys and chimpanzees and are also effective in preventing pregnancy in domestic animals such as swine, cows, sheep and horses. In small animals it is usually convenient to administer the compounds of this invention in the form of a capsule, or incorporated in the feed of the animal. For large animals, parenteral administration is often preferred.

These compounds can be employed in useful compositions according to the present invention in such dosage forms as tablets, capsules, powder packets, or liquid solutions, suspensions, or elixirs, for oral administration or liquid solutions for parenteral use, and in certain cases, suspensions for parenteral use. In such compositions the active ingredient will ordinarily always be present in the amount of at least 0.01% by weight based on the total weight of the composition and not more than 90% by weight.

Beside the estrogenically active ingredient of this invention, the composition will contain a solid or liquid non-toxic pharmaceutical carrier for the active ingredient.

In one embodiment of a pharmaceutical composition of this invention, the solid carrier is a capsule which can be of the ordinary gelatin type. The capsule will contain about 0.03–75% by weight of a compound of this invention and 99.97–25% of a carrier.

In another embodiment, the active ingredient is tableted with or without adjuvants. In yet another embodiment, the active ingredient is put into powder packets. These capsules, tablets, and powders will generally constitute about 0.03% to about 95% and preferably 0.1% to 70% by weight of active ingredient. These dosage forms preferably contain about 0.1 to 700 milligrams of active ingredient, with from about 0.03 milligram to about 350 milligrams most preferred.

The pharmaceutical carrier can be a sterile liquid such as water and oils, including those of petroleum, animal, vegetable or synthetic origin, for example, peanut oil, soybean oil, mineral oil, sesame oil, and the like. In general, water, saline, aqueous dextrose (glucose) and related sugar solutions and glycols, such as propylene glycol or polyethylene glycols, are preferred liquid carriers, particularly for injectable solutions. Sterile injectable solutions, such as saline, will ordinarily contain about 0.0035% to 25%, and preferably about 0.01% to 5% by weight of the active ingredient.

Suitable formulations for oral administration can be prepared in a suspension, syrup or elixir in which the active ingredient ordinarily will constitute about 0.0007 to 5% and preferably about 0.003 to 1% by weight. The pharmaceutical carrier in such composition can be an aqueous vehicle such as an aromatic water, a syrup or a pharmaceutical mucilage.

Suitable pharmaceutical carriers are described in "Remington's Pharmaceutical Sciences" by E. W. Martin, a well-known reference text in this field.

The following examples further illustrate the fertility control in warm-blooded animals by the process of the present invention.

EXAMPLE A

Immature female rats (28 days old) are induced into precocious puberty with a single dose of pregnant mare's serum gonadotrophin and then are mated with normal males 1-trifluoromethyl - 1,2,2 - triphenylethylene (the product of Example 1) suspended in sesame oil is orally administered in graded doses to numerically equal groups of these female rats for six days starting on the day of finding sperm or a vaginal plug. One week after mating, the animals are killed and their uteri are examined for implantation sites. If any are found, the animal is considered pregnant. Control animals have a mean of eight implantation sites. The dose level at which fifty percent of the animals show no evidence of pregnancy, the $ED_{50}$, is 0.13 mg./kg.-day.

The general procedure of the preceding example is repeated with other 1-perfluoroalkyl-1,2,2-triphenylethylenes. Table II summarizes these experiments.

TABLE II

| Example | Compound of Example | $ED_{50}$ in mg./kg.-day |
|---|---|---|
| B | 3 | 0.0049–0.020 |
| C | 4 | 0.078 |
| D | 5 | 0.0049–0.020 |
| E | 6 | 0.020–0.078 |
| F | 7 | 0.078–0.31 |
| G | 8 | 0.0195–0.0788 |
| H | 9 | 0.0195 |
| I | 10 | 0.03 |
| J | 11 | 0.078–0.31 |
| K | 12 | 0.03 |
| L | 13 | 0.03 |
| M | 14 | <0.31 |
| N | 15 | 0.078–0.31 |
| O | 16 | 0.078–0.31 |

The embodiments of the invention in which an exclusive property or privilege is claimed are defined as follows:

1. A compound of the formula

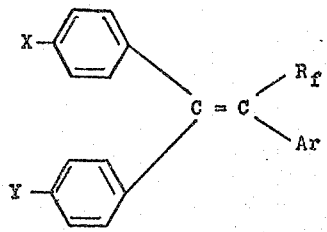

in which
each of X and Y is independently selected from hydrogen and —OR; R is selected from hydrogen, alkyl, and hydroxyalkyl; each R having up to 12 carbon atoms;
Ar is selected from phenyl, phenyl having an OR substituent selected from halogen and lower perfluoroalkyl; R having the above defined meaning, with the proviso that when each of X and Y are hydrogen, Ar is phenyl having an alkoxy substituent in the para position;
and $R_f$ is a perfluoroalkyl group having no more than 3 carbon atoms.

2. 1-(trifluoromethyl)-2-(p-methoxyphenyl) - 1,2 - diphenylethylene, the compound of claim 1 in which X is methoxyl; Y is hydrogen; Ar is phenyl, and $R_f$ is trifluoromethyl.

3. 1-(trifluoromethyl) - 2,2 - di-(p-methoxyphenyl)-1-phenylethylene, the compound of claim 1, in which each of X and Y is methoxyl; Ar is phenyl and $R_f$ is trifluoromethyl.

4. 1-(trifluoromethyl) - 1,2 - di-(p-methoxyphenyl)-2-phenylethylene, the compound of claim 1, in which X is hydrogen; Y is methoxyl; Ar is p-methoxyphenyl, and $R_f$ is trifluoromethyl.

5. 1-(trifluoromethyl) - 1 - (p-methoxyphenyl)-2,2-diphenylethylene, the compound of claim 1, in which each of X and Y is hydrogen, Ar is p-methoxyphenyl, and $R_f$ is trifluoromethyl.

6. Trans-4-fluoro - 4' - methoxy-α'-phenyl-α-(trifluoromethyl)stilbene, the compound of claim 1, in which X is hydrogen; Y is methoxyl; Ar is p-fluorophenyl and $R_f$ is trifluoromethyl.

References Cited

UNITED STATES PATENTS 3,194,809   7/1965   Dice et al. _____ 260—290
2,346,049   4/1944   Rohrmann _____ 260—613 A

OTHER REFERENCES

Fox et al.: Jour. Med. Chem., vol. 8 (1965), pp. 250–251.

Buu-Hoi et al.: Rec. Trav. Chim., vol. 85 (1966), pp. 367–372.

Dice et al.: Jour. Med. Chem., vol. 9 (1966), pp. 176–178.

BERNARD HELFIN, Primary Examiner

U.S. Cl. X.R.

260—613 R, 613 A, 619 A, 619 R, 619 B, 570.7, 479 R, 468 R, 479 S, 468 T, 476 C, 649 F, 463, 297 R, 247.7 A, 326.8, 650 F, 618 D, 999; 424—354